W. K. LEWIS.
BEET DIGGING MACHINE.
APPLICATION FILED MAR. 6, 1917.
1,287,710.
Patented Dec. 17, 1918.
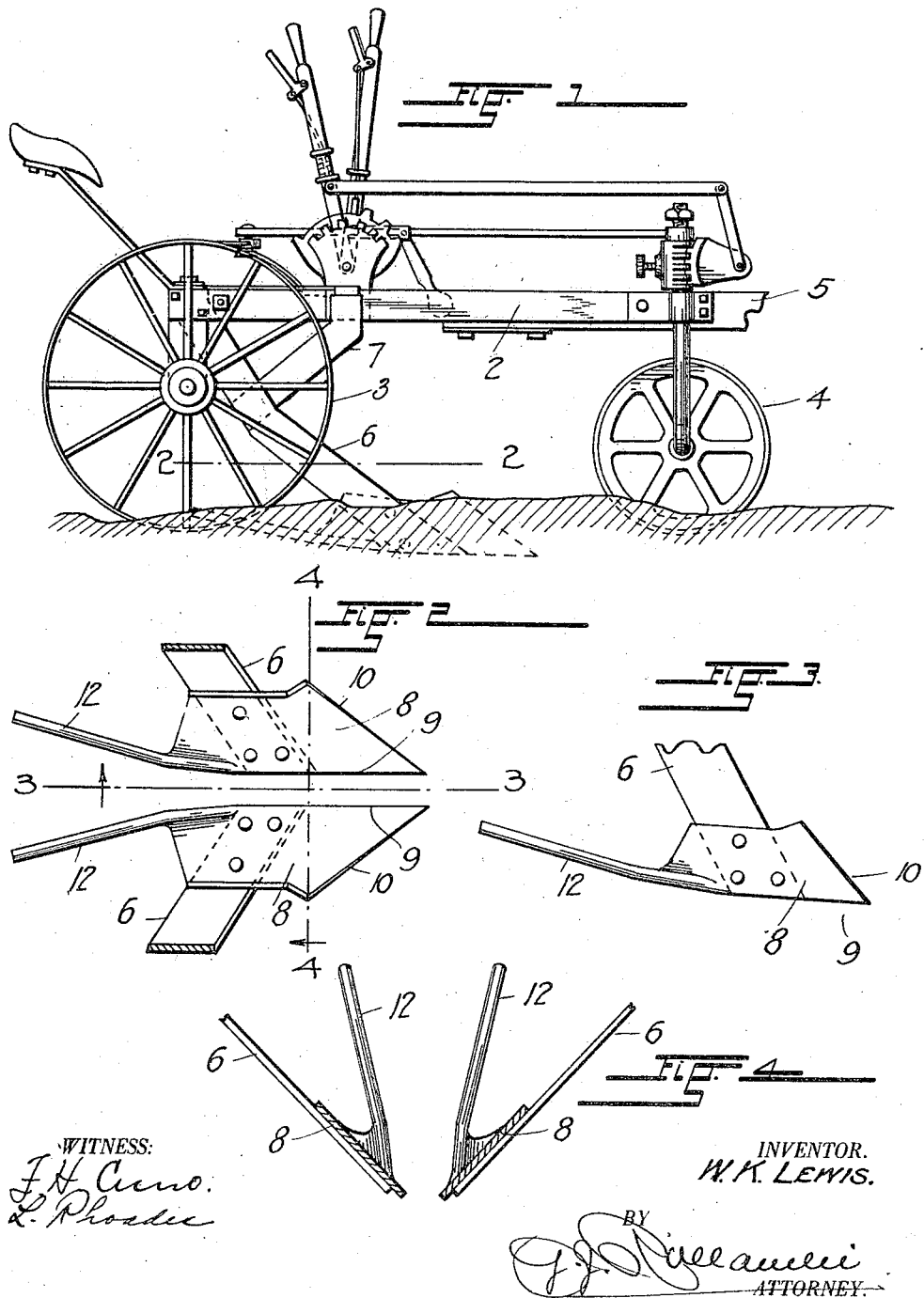

UNITED STATES PATENT OFFICE.

WILLIAM K. LEWIS, OF DENVER, COLORADO.

BEET-DIGGING MACHINE.

1,287,710.   Specification of Letters Patent.   Patented Dec. 17, 1918.

Application filed March 6, 1917. Serial No. 152,879.

*To all whom it may concern:*

Be it known that I, WILLIAM K. LEWIS, a citizen of the United States, residing at Denver, in the county of Denver and State of Colorado, have invented certain new and useful Improvements in Beet-Digging Machines, of which the following is a specification.

My invention relates to improvements in beet-pulling machines and more particularly to the element of the machine by which the beet roots are loosened and lifted out of the ground.

It is the object of my invention to provide in a beet harvesting machine, a pair of blades which loosen the ground at opposite sides of a row of beet plants along which the machine is moved, and in integral connection with said blades, a pair of rearwardly projecting rods by which the beets are lifted above the surface of the ground.

The blades consist of smooth-faced oblong metal plates cut obliquely at their forward ends and sharpened to provide the cutting-edges which cleave the ground during forward movement of the machine.

The two blades are placed convergently with their lower edges spaced from each other and the rods at their rearward ends project upwardly from the lower corners of the same.

The rods extend inwardly with respect to the smooth inner faces of the blades and taper gradually along said faces to merge thereinto at their ends.

In the operation of the machine, the beet plants loosened by the cutting-action of the blades, pass through the space between them and upwardly along the slanting rods which lift them above the surface of the ground, irrespective of their size and without injury to their roots.

In the accompanying drawings in the various views of which like parts are similarly designated, Figure 1 is an elevation of a beet-pulling machine to which my improved beet-lifting element has been applied.

Fig. 2, a section along the line 2—2, Fig. 1, drawn to a slightly enlarged scale, Fig. 3, a side elevation of one of the members of the beet lifting element, looking in the direction of the arrow drawn across the line 3—3, Fig. 2, and Fig. 4, a transverse section taken along the line 4—4, Fig. 2.

In the drawings the reference numeral 2 designates the frame of a beet pulling machine which is supported upon wheels 3 and 4.

A tongue 5 is pivotally attached at the front end of the frame for the usual purpose and adjustments carried on the frame are provided to elevate the front wheels and the beet lifting element above the surface of the ground in turning or transporting the machine, and to regulate the depth at which the beet lifting element is drawn through the ground when the machine is in operation.

The beet-lifting element is suspended from the frame at the lower ends of two convergent arms 6 which extend forwardly from the rear end of the machine and are reinforced by braces 7.

The element which in the operation of the machine lifts the beet roots and deposits them upon the surface of the ground, is composed of two smooth-faced blades 8 which are attached at the lower ends of the arms 6 in laterally convergent relation to each other.

The lower edges 9 of the blades are spaced in substantially parallel relation to each other and their forward edges 10 are sharpened and slant rearwardly to penetrate the ground along which the machine is propelled.

The blades have at their rearward ends, rearwardly projecting tail rods 12 which slant upwardly and diverge to provide a gradually widening passage for the beets.

The rods may be formed integrally with the blades or they may be made separately of standard material and attached to the blades by welding, rivets, bolts or other similar fastening means, the rods extend inwardly of the smooth inner surfaces of the blades and taper gradually along said faces to merge thereinto at their ends.

In the operation of the machine, the blades of the beet-lifting element are drawn through the ground at opposite sides of the rows of beets which in consequence are loosened and gradually lifted by the upwardly slanting tails which deposit them upon the surface of the ground.

It will be understood that by making the blades of two separate parts, their production is cheapened and facilitated, and that in case of breakage of the tail pieces the blades can be readily repaired in any convenient blacksmith's shop.

Having thus described my invention what

I claim and desire to secure by Letters-Patent is:

1. A beet lifting device for beet-pulling machines comprising an oblong smooth-faced blade having one of its ends cut obliquely and sharpened to provide a cutting edge, and a tail piece projecting rearwardly and upwardly from the lower portion of the opposite end of the blade with its adjoining end portion extending along and merging into the face of the same.

2. In a beet-pulling machine, a pair of smooth-faced oblong blades spaced at their lower edges and having their faces diverging from said edges, said blades having their forward ends cut obliquely and sharpened to provide cutting-edges, and tail pieces projecting rearwardly and upwardly from the lower portions of the opposite ends of the blades with their adjoining end portions extending along and merging into said faces of the same.

In testimony whereof I have affixed my signature in presence of two witnesses.

WILLIAM K. LEWIS.

Witnesses:
G. J. ROLLANDET,
L. RHOADES.

Copies of this patent may be obtained for five cents each, by addressing the "Commissioner of Patents, Washington, D. C."